(12) United States Patent
Hasegawa et al.

(10) Patent No.: US 12,305,005 B2
(45) Date of Patent: May 20, 2025

(54) RESIN COMPOSITION WITH LIGNIN SKELETON AND RESIN COMPOSITION MOLDED ARTICLE

(71) Applicants: FUJI ELECTRIC CO., LTD., Kawasaki (JP); MIE UNIVERSITY, Tsu (JP)

(72) Inventors: Tomoki Hasegawa, Hino (JP); Masamitsu Funaoka, Tsu (JP)

(73) Assignees: FUJI ELECTRIC CO., LTD., Kawasaki (JP); MIE UNIVERSITY, Tsu (JP)

( * ) Notice: Subject to any disclaimer, the term of this patent is extended or adjusted under 35 U.S.C. 154(b) by 1878 days.

(21) Appl. No.: 15/994,537

(22) Filed: May 31, 2018

(65) Prior Publication Data

US 2018/0273694 A1    Sep. 27, 2018

Related U.S. Application Data

(63) Continuation of application No. PCT/JP2017/015482, filed on Apr. 17, 2017.

(30) Foreign Application Priority Data

Apr. 19, 2016 (JP) .................... 2016-083745

(51) Int. Cl.
| | | |
|---|---|---|
| C08H 7/00 | (2011.01) | |
| B29C 39/00 | (2006.01) | |
| B29C 39/38 | (2006.01) | |
| B29K 63/00 | (2006.01) | |
| B29K 75/00 | (2006.01) | |
| C07G 1/00 | (2011.01) | |
| C08F 120/30 | (2006.01) | |
| C08G 18/24 | (2006.01) | |
| C08G 18/32 | (2006.01) | |
| C08G 18/76 | (2006.01) | |

(Continued)

(52) U.S. Cl.
CPC ............ *C08H 6/00* (2013.01); *B29C 39/003* (2013.01); *B29C 39/38* (2013.01); *C07G 1/00* (2013.01); *C08F 120/30* (2013.01); *C08G 18/242* (2013.01); *C08G 18/3215* (2013.01); *C08G 18/7671* (2013.01); *C08G 59/063* (2013.01); *C08L 97/005* (2013.01); *C22B 7/003* (2013.01); *B29K 2063/00* (2013.01); *B29K 2075/00* (2013.01); *Y02P 10/20* (2015.11)

(58) Field of Classification Search
CPC .................... C07G 1/00; C08H 6/00
See application file for complete search history.

(56) References Cited

U.S. PATENT DOCUMENTS

| 5,322,753 A | 6/1994 | Tamura |
| 5,488,137 A | 1/1996 | Tamura et al. |

(Continued)

FOREIGN PATENT DOCUMENTS

| DE | 697 35 372 T2 | 10/2006 |
| JP | 62-32131 | 2/1987 |

(Continued)

OTHER PUBLICATIONS

Kadota et al (A New Epoxy Resins from Bioresources-based Lignophenol, J of Network Polymer, Japan, 2006, vol. 27 Issue 2, 118-125) (Year: 2006).*
Machine translation of Kadota et al (A New Epoxy Resins from Bioresources-based Lignophenol, J of Network Polymer, Japan, 2006, vol. 27 Issue 2, 118-125) (Year: 2006).*

(Continued)

*Primary Examiner* — Wenwen Cai

(57) ABSTRACT

A resin composition including a lignin skeleton capable of producing a heat-resistant molded article and being decomposed under relatively mild conditions. The resin composition contains a lignin skeleton including, as a base component, a phenolated lignin or a derivative thereof that contains a reactive monomer group, the phenolated lignin containing a phenol-containing monomer represented by the following general formula (I):

[Chem. 1]

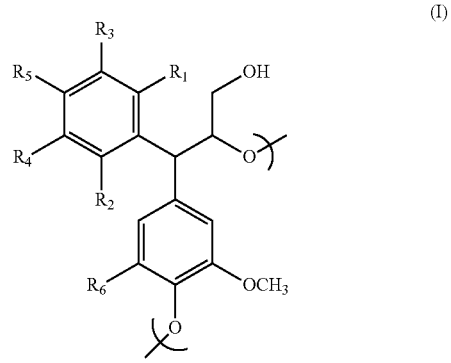

wherein $R_1$ to $R_5$ are each independently a monovalent group selected from H, OH, a $C_1$ to $C_6$ alkyl group, a $C_1$ to $C_6$ alkoxy group, and a $C_6$ to $C_{10}$ aryl group, or adjacent substituents among $R_1$ to $R_5$ form a substituted or unsubstituted aromatic ring together, at least one of $R_1$ and $R_2$ is a hydroxyl group, and $R_6$ is $OCH_3$ or H; a molded article thereof, as well as a recycling method for a molded article formed in a mold formed of the resin composition.

8 Claims, No Drawings

(51) Int. Cl.
   *C08G 59/06*   (2006.01)
   *C08L 97/00*   (2006.01)
   *C22B 7/00*    (2006.01)

(56) References Cited

U.S. PATENT DOCUMENTS

| | | | |
|---|---|---|---|
| 5,608,010 | A | 3/1997 | Tamura et al. |
| 6,632,931 | B1 | 10/2003 | Funaoka |
| 6,841,660 | B1 | 1/2005 | Funaoka |
| 2005/0154194 | A1 | 7/2005 | Funaoka |
| 2008/0262182 | A1 | 10/2008 | Funaoka |
| 2010/0155122 | A1 | 6/2010 | Okabe et al. |

FOREIGN PATENT DOCUMENTS

| | | |
|---|---|---|
| JP | 62-184034 | 8/1987 |
| JP | 4-100834 | 4/1992 |
| JP | 7-75280 | 3/1995 |
| JP | 9-278904 | 10/1997 |
| JP | 10-308129 | 11/1998 |
| JP | 2000-72888 | 3/2000 |
| JP | 3164426 B2 | 3/2001 |
| JP | 2001-261839 | 9/2001 |
| JP | 2003-175527 | 6/2003 |
| JP | 2004-210816 | 7/2004 |
| JP | 2004-238539 A | 8/2004 |
| JP | 2009-167306 A | 7/2009 |
| JP | 2009-292884 | 12/2009 |
| JP | 2011-57997 | 3/2011 |
| WO | WO 2015/147165 A1 | 10/2015 |

OTHER PUBLICATIONS

Rowell et al (Cell Wall Chemistry from: Handbook of Wood Chemistry and Wood Composites, Sep. 6, 2012, CRC Press) (Year: 2012).*

Grzybek et al (Organosolv Lignin from European Tree Bark: Influence of Bark Pretreatment, Materials 2021, 14, 7774). (Year: 2021).*

International Search Report mailed Jun. 27, 2017 in corresponding International Patent Application No. PCT/JP2017/015482.

Kazunobu Maekawa et al., "FRP Recycling Technology Invalving Depolymerization of Unsaturated Polyester Under Ordinary Pressure", Hitachi Chemical Technical Report No. 42, Jan. 2004, pp. 21-24.

Katsuji Shibata et al., "CFRP Recycling Technology Using Depolymerization under Ordinary Pressure", Hitachi Chemical Technical Report No. 56, Dec. 2013, pp. 6-11.

"Network polymers", 2006, vol. 27, No. 2, p. 118-125 (Cited in Japanese Office Action).

Joji Kadota, "Development of Adhesives Based on Bioresourced Lignophenol", Journal of the Japan Adhesion Society, 2007, vol. 43, No. 1, p. 20-25 (Cited in Japanese Office Action).

Japanese Office Action dated Oct. 1, 2019 in corresponding Japanese Patent Application No. 2018-513175.

German Office Action dated Sep. 15, 2020, in corresponding German Patent Application No. 112017000191.9.

Japanese Office Action dated Mar. 17, 2021, in corresponding Japanese Patent Application No. 2020-014908.

German Office Action dated Jul. 27, 2023 for corresponding German Application No. 11 2017 000 191.9.

Lignin-Römpp, Thieme; [https://roempp.thieme.de/lexicon/RD-12-01138?searchterm=lignin&context=search] retrieved on Jul. 27, 2023, 12 pages.

Tomoki Hasegawa et al., "Kozo Kahengata Lignophenol Yurai Epoxy Resin no Kokabutsu Tokusei", Dai 24 Kai Polymer Material Forum Koen Yokoshu, Nov. 11, 2015, p. 153, with English translation "Cured Material Properties of Structurally Variable Lignophenol-derived Epoxy Resins", Fuji Electric Co., Ltd., Graduate School of Biological Resources, Mie University Tomoki Hasegawa, Masamitsu Funaoka, Kenji Okamoto, The 24th Polymer Materials Forum (2015), p. 153.

* cited by examiner

RESIN COMPOSITION WITH LIGNIN SKELETON AND RESIN COMPOSITION MOLDED ARTICLE

CROSS REFERENCE TO RELATED APPLICATIONS

This application is a continuation application, filed under 35 U.S.C. § 111 (a), of International Patent Application No. PCT/JP2017/015482, filed Apr. 17, 2017, which claims foreign priority benefit under 35 U.S.C. § 119 of Japanese Patent Application No. 2016-083745 filed Apr. 19, 2016, the contents of which are incorporated herein by reference.

TECHNICAL FIELD

The present invention relates to a resin composition containing a lignin skeleton from plant-derived lignin as a raw material, and relates to a molded article using the resin composition formed in a mold.

BACKGROUND ART

Thermosetting resins three-dimensionally crosslinked by thermosetting reaction are generally insoluble and infusible solids, and accordingly, processes for decomposition disposal for such thermosetting resins are difficult. Thermosetting resin molded articles have conventionally typically been disposed of by incineration or burying in landfills. However, landfill disposal causes problems such as difficulty in finding landfill sites and destabilization of the ground after disposal in the landfill, whereas incineration causes problems such as generation of harmful gases and bad odors. With recent increase in attention being paid to the environment there has been demand for disposal technologies and recycling technologies that would be effective for thermosetting resin products as well.

As a method of recycling thermosetting resin molded articles containing added inorganic substances, such as FRP (fiber-reinforced plastic), BMC (bulk molding compound), and SMC (sheet molding compound), a method in which thermosetting resin molded articles are pulverized and added as fillers to virgin materials up to approximately 20%, a method in which thermosetting resin molded articles are thermally decomposed and returned as raw materials for chemical recycling, and a method in which a decomposition process is conducted using microwaves, and the like, have been mainly studied.

For example, Patent Document 1 proposes a device that pulverizes, melts, and thermally decomposes waste plastics to obtain cracked petroleum, Patent Document 2 proposes a petrochemical apparatus for plastic waste, and Patent Document 3 proposes a method of thermally decomposing waste of glass-fiber-reinforced thermosetting resins, and the like. To this end, pulverizers, such as a hammer mill, heaters, and the like are used as processing apparatuses. A molded article that is a molded transformer generally occupies large amounts of space and has poor efficiency in storage and transportation after use. To solve this, mechanical pulverization is currently employed; however, such mechanical pulverization requires large amounts of energy for crushing and currently generates excessive noise.

In addition, for thermosetting resin molded components, it is necessary to recover valuable materials such as metals and ceramics in the components at the time of disposal in view of effectively utilizing natural resources. In the mechanical pulverizing process for waste of thermosetting resin molded components, it is difficult to pulverize such waste due to high mechanical strength of cured thermosetting resin products, and it is also difficult to completely separate resins and incorporated valuable materials. There is also a problem, for example, that when resin molded components are heated to thermally decompose resins at a high temperature, the valuable materials therein are also oxidized.

As a method capable of easily separating an incorporated component and a thermosetting resin in a resin molded component, Patent Document 4 proposes a method including providing a coating layer between a thermosetting resin and an incorporated component. However, this method requires modification of designs, additional manufacturing processes, and the like, for manufacturing resin molded components.

Although the above-described processing methods are all for conducting decomposition processes for conventional thermosetting resins, there is also a method of providing thermosetting resins which themselves have easily decomposable structures.

Patent Document 5 proposes a method of burying a molded material blended with a biodegradable resin, which is a plastic decomposable by the action of naturally occurring microorganisms such as bacteria and fungi, into an activated sludge or the like for processing, and the like. This method, however, has problems such as although biodegradable portions are decomposed, other portions remain undecomposed, and that decomposition takes a long time. In addition, techniques disclosed in Non-Patent Documents 1 and 2 have problems in that these techniques require use of special solvents and catalysts for decomposing epoxy resins, and further require processing at a temperature equal to, or larger than 190° C., which results in high costs for recycling.

REFERENCE DOCUMENT LIST

Patent Documents

Patent Document 1: JP 62-32131A
Patent Document 2: JP 62-184034A
Patent Document 3: JP 4-100834A
Patent Document 4: JP 10-308129 A
Patent Document 5: JP 7-75280 A

Non-Patent Documents

Non-Patent Document 1: Hitachi Chemical Technical Report No. 42 (2004.1)
Non-Patent Document 2: Hitachi Chemical Technical Report No. 56 (2013.12)

SUMMARY OF THE INVENTION

Problem to be Solved by the Invention

An object of the present invention is to obtain a resin composition containing a lignin skeleton and having superior moldability and degradability, to obtain a molded article made therefrom, and to obtain a molded article made therefrom and formed in a mold.

Means for Solving the Problem

As a result of extensive research, the present inventors have completed the invention, as described below. Specifically, according to one embodiment, the present invention is [1] a resin composition containing a lignin skeleton, including: as a base component, a phenolated lignin or a derivative thereof that contains a reactive monomer group, the phenolated lignin containing a phenol-containing monomer represented by the following general formula (I):

[Chem. 1]

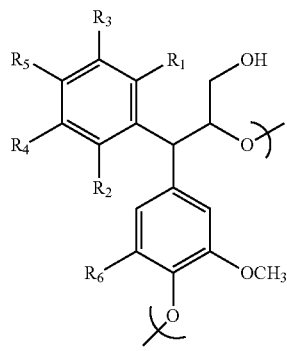

(I)

wherein $R_1$ to $R_5$ are each independently a monovalent group selected from H, OH, a $C_1$ to $C_6$ alkyl group, a $C_1$ to $C_6$ alkoxy group, and a $C_6$ to $C_{10}$ aryl group, or adjacent substituents among $R_1$ to $R_5$ form a substituted or unsubstituted aromatic ring together, and at least one of $R_1$ and $R_2$ is a hydroxyl group, and $R_6$ is $OCH_3$ or H.

[2] It is preferable that the phenolated lignin contain a phenol-containing monomer in which at least one of $R_1$ and $R_2$ is a hydroxyl group in the general formula (I), at a mole fraction of 30% or more when a total molar amount of phenol-containing monomers in the phenolated lignin is taken as 100%.

[3] It is preferable that in the composition according to the above-described [1] or [2], the phenolated lignin contain a phenol-containing monomer having a syringyl-type skeleton in which $R_6$ is $OCH_3$ in the general formula (I), at a mole fraction of 40% or more when a total molar amount of phenol-containing monomers in the phenolated lignin is taken as 100%.

[4] It is preferable that the composition according to any one of the above-described [1] to [3] include: as a base component, the derivative of the phenolated lignin that contains the reactive monomer group, wherein
the derivative is
  (a) an epoxidized lignin obtained by binding a compound containing an epoxy group to the phenolated lignin or
  (b) an acrylated lignin obtained by binding a compound containing an acryl group or a methacryl group to the phenolated lignin.

[5] It is preferable that the composition according to any one of the above-described [1] to [3] include: as a base component, the phenolated lignin, and further include, as a curing agent,
  (c) an isocyanate compound or
  (d) an aldehyde compound.

[6] It is preferable that in the composition according to any one of the above-described [1] to [5], a mass ratio of the phenolated lignin or the derivative thereof that contains a reactive monomer group be 50% or more when a total mass of a resin base component is taken as 100%.

[7] It is preferable that in the composition according to any one of the above-described [1] to [5], a mass ratio of the phenolated lignin or the derivative thereof that contains a reactive monomer group be 70% or more when a total mass of a resin base component is taken as 100%.

[8] It is preferable that the composition according to any one of the above-described [1] to [5] include no resin base components other than the phenolated lignin or the derivative thereof that contains a reactive monomer group.

[9] It is preferable that the composition according to any one of the above-described [1] to [8] further include a catalyst. Note that in the present invention, the catalyst collectively refers to compounds that promote polymerization, cross-linkage, and curing reaction, such as polymerization initiators, and cross-linking curing accelerators.

[10] According to another embodiment, the present invention relates to a resin molded article formed by molding the resin composition according to any one of the above-described [1] to [9].

[11] According to yet another embodiment, the present invention relates to a molded article formed in a mold by encapsulating a member that contains a metal material and/or a ceramic material with the resin composition according to any one of the above-described [1] to [9].

[12] It is preferable that the molded article formed in a mold according to the above-described [11] be a semiconductor device.

[13] It is preferable that the molded article formed in a mold according to the above-described [11] be a molded transformer.

[14] It is preferable that the molded article formed in a mold according to the above-described [11] be a switchgear.

[15] According to yet another embodiment, the present invention relates to a recycling method for a metal material and/or a ceramic material contained in the molded article formed in a mold according to the above-described [11], including: a step of processing the molded article formed in a mold at 120 to 150° C. in an alkaline solution.

Effects of the Invention

The resin composition containing a lignin skeleton according to the present invention can be molded using only a lignin-skeleton-containing resin as a base component without mixing other synthetic resins or natural resins to obtain a resin molded article. This molded article can not only provide insulation to electric devices which are used under high-temperature conditions as a molded member for the electrical devices, but can also be decomposed under predetermined relatively mild conditions and in a short period of time, making it possible to recover valuable materials such as metal materials and ceramic materials at low costs.

MODES FOR CARRYING OUT THE INVENTION

Hereinafter, embodiments of the present invention are described with reference to the drawings. Note that, however, the present invention is not limited to the embodiments described below.

First Embodiment: Resin Composition Containing a Lignin Skeleton

According to a first Embodiment, the present invention relates to a resin composition containing a lignin skeleton. The lignin-skeleton-containing resin composition contains, as a base component, a resin that contains a lignin skeleton. The resin base component that contains a lignin skeleton is a phenolated lignin or a derivative thereof. The phenolated lignin derivative is a derivative in which a reactive monomer group is covalent bonded to a phenolated lignin.

In the present Embodiment, the phenolated lignin contains a phenol-containing monomer represented by the following general formula (I):

[Chem. 2]

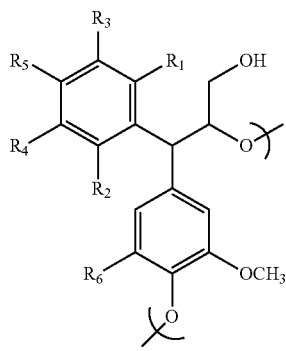

(I)

wherein $R_1$ to $R_5$ are each independently a monovalent group selected from H, OH, a $C_1$ to $C_6$ alkyl group, a $C_1$ to $C_6$ alkoxy group, and a $C_6$ to $C_{10}$ aryl group, or adjacent substituents among $R_1$ to $R_5$ form a substituted or unsubstituted aromatic ring together, and at least one of $R_1$ and $R_2$ is a hydroxyl group, and $R_6$ is $OCH_3$ or H.

In particular, it is preferable that in the formula (I), a group represented by

[Chem. 3]

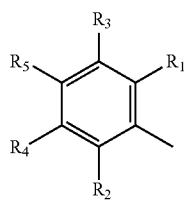

(A)

be a group in which one hydrogen atom was removed from phenol, naphthol, antroquinonol, catechol, resorcinol, hydroquinone, or pyrogallol which each may have one or more substituents, and at least one of $R_1$ and $R_2$ is a hydroxyl group. The substituent is not particularly limited to a specific one, and may be any substituent, but preferably is a group other than electron acceptor groups (such as a halogen atom). Specific substituent includes, but is not limited to, $C_1$ to $C_6$ alkyl groups such as a methyl group, an ethyl group, a propyl group, $C_1$ to $C_6$ alkoxy groups such as a methoxy group, an ethoxy group, a propoxy group, and $C_6$ to $C_{10}$ aryl groups such as a phenyl group.

In addition, the phenolated lignin of the present invention may contain only one type of the phenol-containing monomer represented by the formula (I) or may contain two or more types of the phenol-containing monomer, and their ratios are not particularly limited.

The phenolated lignin of the present invention may contain a phenol-containing monomer that does not satisfy the definition of the substituent of the formula (I) in addition to the phenol-containing monomer represented by the formula (I). The phenol-containing monomer that does not satisfy the definition of the substituent of the formula (I) includes a group in which one hydrogen atom was removed from phenol, naphthol, antroquinonol, catechol, resorcinol, hydroquinone, or pyrogallol which each may have one or more substituents in a group represented by (A) in the formula (I), and in which none of $R_1$ and $R_2$ is a hydroxyl group. Note that the substituent in this case may be the same substituent as that defined as the group represented by (A) in the formula (I) except that none of $R_1$ and $R_2$ is a hydroxyl group. Even when a phenol-containing monomer that does not satisfy the formula (I) is contained, it is preferable that the phenolated lignin of the present invention contain the phenol-containing monomer represented by the formula (I) at a mole fraction of 30% or more relative to the total amount of moles of the phenol-containing monomer. This is from the viewpoint of a decomposition temperature at the time of recycling.

Moreover, it is preferable that the phenolated lignin of the present invention contain a phenol-containing monomer in which $R_6$ is $OCH_3$ (a methoxy group) in the formula (I) at a mole fraction of 40% or more relative to the total amount of moles of the phenol-containing monomer unit. This is for maintaining the moldability of the resin and enhancing the degradability of the molded article. Such a phenolated lignin can be obtained by selecting a starting substance from a predetermined plant in a manufacturing method described below.

A phenolated lignin is made up of a plurality of phenol-containing monomers of one type or two or more types being bonded to one another as described above, and the total number of repeating units is for example 3 to 10 and may be 1 to 15, but is not limited to a specific total number of repeating units. In addition, the terminal structure of the phenolated lignin is derived from a natural product, and sometimes cannot be specifically identified.

Next, the phenolated lignin according to the present Embodiment is described from the viewpoint of the manufacturing method. A process of manufacturing a phenolated lignin from a plant raw material can be performed by means of an approach disclosed in JP 2010-159381A. Specifically, a phenolated lignin can be obtained from a plant raw material as a starting raw material. It is preferable to use, as the plant raw material, a plant that contains a syringyl-type phenyl propane unit (C6-C3 unit), which is a basic skeleton, at a mole fraction of 40% or more. For example, broad-leaf trees such as beech, birch, and moso-bamboo and herbaceous plants such as rice and wheat are preferable. With a raw material in which the mole fraction of the syringyl-type phenyl propane unit is less than 40%, the thermal melting temperature (softening point) becomes 100° C. or more, and a sufficient thermal fluidity cannot be obtained, so that the molding sometimes becomes difficult. Using such a raw material allows a phenolated lignin thus obtained to contain a phenol-containing monomer having a syringyl-type skeleton in which $R_6$ is a methoxy group in the general formula (I) at a mole fraction of 40% or more. From the plant raw material, phenolic compounds other than lignin, for example, impurities such as polyphenol and catechin can be removed by conducting a degreasing step prior to phenolization.

The phenolated lignin can be obtained by conducting, after the step of solvating these plant raw materials with a phenol compound, the step of adding and mixing an acid to and with the plant raw materials solvated with the phenol compound. As the phenol compound, a monovalent phenol compound, a divalent phenol compound, a trivalent phenol compound, or the like can be used. Specific examples of the monovalent phenol compound include phenol which may have one or more substituents, naphthol which may have one or more substituents, and antroquinonol which may have one or more substituents. Specific examples of the divalent phenol compound include catechol which may have one or more substituents, resorcinol which may have one or more substituents, and hydroquinone which may have one or more substituents. Specific examples of the trivalent phenol compound include pyrogallol which may have one or more substituents. The substituents are the same as those defined for the group represented by (A) in the general formula (I).

In order to obtain a phenolated lignin containing phenol-containing monomers of desired types and mole fractions, it is possible to select the types of phenol compounds used in the above-described solvating step and the mole fractions of these phenol compounds. For example, in order to obtain a phenolated lignin containing a phenol-containing monomer in which the group represented by (A) is cresol and a phenol-containing monomer in which the group represented by (A) is xylenol in a molar ratio of X:Y, a mixture of cresol and xylenol in a molar ratio of X:Y may be used as the phenol compounds used for the solvation.

The acid used in the step of adding and mixing an acid to and with the plant raw material is preferably an acid having a swelling property for cellulose. Specific examples of the acid include, for example, but are not limited to, sulfuric acid having a concentration of 65% by mass or more (for example, sulfuric acid having a concentration of 72% by mass), phosphoric acid having a concentration of 85% by mass or more, hydrochloric acid, p-toluenesulfonic acid, trifluoroacetic acid, tirchloroacetic acid, and formic acid having a concentration of 38% by mass or more.

Since the phenolated lignin obtained by the above-described method has a lignin skeleton and contains a large number of phenolic hydroxyl groups, the phenolated lignin functions as a base component for a thermosetting resin. For example, a phenolic resin containing a lignin skeleton can be obtained by using the phenolic hydroxyl group of the phenolated lignin as a reactive group and an aldehyde compound such as formaldehyde as a curing agent. Alternatively, a urethane resin containing a lignin skeleton can be obtained by using the phenolic hydroxyl group of the phenolated lignin as a reactive group and an isocyanate compound as a curing agent.

Alternatively, a derivative of the phenolated lignin can also be used as a base component. For example, an epoxy derivative of the phenolated lignin, which is obtained by binding a compound having an epoxy group to the phenolated lignin (referred to also as an epoxidized lignin) functions as a base component for a thermosetting resin and can provide an epoxy resin by optionally using a curing agent. Alternatively, an acrylic derivative of the phenolated lignin, which is obtained by binding a compound having an acryl group or a methacryl group to the phenolated lignin (referred to also as an acrylated lignin) can be polymerized to obtain an acrylic resin.

In the present invention, it is possible to manufacture a variety of resin compositions and molded articles by selecting the type of a cross-linking agent to be bound to the phenolated lignin or the type of a phenolated lignin derivative. Hereinafter, each aspect is described.

[1] Lignin-Skeleton-Containing Epoxy Resin Composition

According to a first aspect, the resin composition containing a lignin skeleton is a lignin-skeleton-containing epoxy resin composition. The lignin-skeleton-containing epoxy resin composition according to the present aspect contains, as a base component, an epoxy derivative (epoxidized lignin) of the phenolated lignin containing the phenol-containing monomer represented by the general formula (I). The lignin-skeleton-containing epoxy resin composition may optionally contain a curing agent, a curing accelerator, and another epoxy compound in addition to the epoxidized lignin resin as the base component.

The epoxidized lignin resin is a polymerizable compound obtained by binding a compound that includes an epoxy group to a phenolated lignin containing a phenol-containing monomer represented by the general formula (I). The compound that includes an epoxy group includes, but is not limited to, epichlorohydrin. The composition according to the present aspect may contain two or more types of epoxidized lignins having different compounds that have epoxy groups to be bound to the phenolated lignin. In addition, the phenolated lignin to be epoxidized may be, as described above, one type or a mixture of two or more types manufactured by different synthesis methods (different plant raw materials and/or different phenol compounds) as long as the phenolated lignin contains the phenol-containing monomer represented by the general formula (I) and meets predetermined conditions.

The step of epoxidizing the phenolated lignin can be conducted by epoxidizing the aforementioned phenolated lignin in accordance with any desired method. As one example of the epoxidizing step, an approach described in "*EPOKISHIKA-RIGUFENORU NIYORU JOUONNKOUKA-EPOKISHIJUSHI NO KOUSEINOUKA* (Enhancement of Performance of Room Temperature Setting Epoxy Resin by Using Epoxidized Lignophenol)", Journal of Network Polymer, Vol. 31, No. 4 (2010) can be used. Specifically, an epoxidized lignophenol having a denaturable lignin skeleton can be obtained by conducting the steps of: dissolving a phenolated lignin in an epichlorohydrin solvent; mixing the phenolated lignin dissolved in the epichiorohydrin solvent with a sodium hydroxide solution under a reduced pressure condition and a predetermined temperature condition; and stirring a mixed solution thus obtained. At this time, the reduced pressure condition and the temperature condition may be set at 50 to 150 mmHg and at 50 to 70° C., respectively, but are not limited to these specific conditions. In addition, the stirring time may be set at 1 to 5 hours, but is not limited to any specific time. A compound that includes an epoxy group to be bound to the phenolated lignin by the present method is generally one represented by

[Chem. 4]

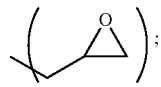

however, any compound can be employed as long as the compound includes an epoxy group, and the compound is not limited to the above-described structure. In addition, when the epoxidation is conducted using epichlorohydrin, hydrogen is removed from 1 or more phenolic hydroxyl groups that are contained in the phenolated lignin and a functional group having an epoxy group represented by the above-described formula is bound thereto.

In addition, the lignin-skeleton-containing epoxy resin composition may mixedly contain an epoxy resin base component that is not derived from lignin, that is, does not have a lignin skeleton, and an epoxy resin base component having a lignin skeleton that does not satisfy the general formula (I). The epoxy resin base component in this case may be any epoxy resin base component that is generally used for obtaining an epoxy resin cured product, and includes for example, but is not limited to, bisphenol A epoxy, bisphenol F epoxy, bisphenol AD epoxy, biphenyl epoxy, cresol novolac epoxy, polyfunctional epoxy of trifunctional or more type, and alicyclic epoxy resins. In addition, the epoxy resin base component may be a mixture of two or more of these. When these epoxy resin base components are mixedly present as the epoxy resin base component, the epoxidized lignin resin obtained by epoxidizing a phenolated lignin containing the phenol-containing monomer represented by the general formula (I) is contained preferably at 50% or more, more preferably at 70% or more, and further preferably at 90% or more in terms of % by mass when the total mass of the base component is taken as 100%. Most preferably, in an epoxy resin composition, the base component is made up of the epoxidized lignin resin at 100% Although a lignin-skeleton-containing epoxy resin composition that uses only an epoxidized lignin resin as an epoxy resin base component has conventionally not been able to be molded, the present invention has made it possible for the first time to obtain a molded article made up of a cured product of a lignin-skeleton-containing epoxy resin that uses only an epoxidized lignin as a base component.

This resin composition may optionally contain a curing agent, a curing accelerator (curing catalyst) and various additives suitable for its application.

As the curing agent that may be optionally added, it is possible to use an aromatic polyamine-based curing agent, an acid anhydride-based curing agent, and a phenolic resin-based curing agent, which are generally used as curing agents for epoxy resins, but the curing agent is not limited to these. In particular, from the viewpoint of obtaining an epoxy resin made up of only a lignin-derived environment-conscious material, it is preferable to use as a curing agent a phenolated lignin containing the phenol-containing monomer represented by the general formula (I) or a phenolated lignin that has another lignin skeleton. When a curing agent is used, the amount of the curing agent to be added is preferably 70 to 110 parts by mass, and further preferably 85 to 100 parts by mass, relative to 100 parts by mass of the epoxidized lignin which is the base component. Note that there sometimes is no need to use any curing agent.

Similarly, as the curing accelerator (catalyst) that may be optionally added, it is possible to blend any of generally used publicly-known curing accelerators as a simple substance, or two or more types of them in combination, as necessary. This curing accelerator includes, but is not limited to, tertiary amine compounds, imidazoles, organic sulfines, phosphorus compounds, tetraphenyl boron salts, and derivatives of these. The amount of the curing accelerator to be blended is not particularly limited as long as the amount allows the curing to be achieved, but is, for example, preferably 0.5 to 5 parts by mass, and further preferably 2 to 4 parts by mass, relative to 100 parts by mass of the epoxidized lignin which is the base component. Among these, an imidazole-based curing accelerator is preferably used.

Various additives may be added to the lignin-skeleton-containing epoxy resin composition according to the present aspect in accordance with its application for usage. For example, when the lignin-skeleton-containing epoxy resin composition according to the present aspect is used as a molding resin for a molded transformer, additives such as a flexibilizer, a flame retardant, a colorant, an antioxidant, and an inorganic filler may be further added.

When the lignin-skeleton-containing epoxy resin composition according to the present aspect is used as an encapsulant for a semiconductor device, additives include, but are not limited to, an inorganic filler, a flame retardant, a pigment for coloring the resin, and a plasticizer and a silicone elastomer for improving the crack resistance. The amounts of these to be added may be determined by those skilled in the art as appropriate in accordance with the specifications required for semiconductor devices and/or encapsulants.

The lignin-skeleton-containing epoxy resin composition according to the present aspect can be cured into a molded article, and particularly can be favorably used as a molding resin for a molded article formed in a mold.

[2] Lignin-Skeleton-Containing Acrylic Resin Composition

According to a second aspect, the resin composition containing a lignin skeleton is a lignin-skeleton-containing acrylic resin composition. The lignin-skeleton-containing acrylic resin composition according to the present aspect contains, as a base component, an acrylic derivative (referred to also as an acrylated lignin resin) of the phenolated lignin containing the phenol-containing monomer represented by the general formula (I). The lignin-skeleton-containing acrylic resin composition may optionally contain a (polymerization) initiator and another acrylic monomer in addition to the acrylated lignin resin as the base component.

The acrylated lignin resin is a polymerizable compound obtained by binding a compound that includes an acryl group or a methacryl group to a phenolated lignin containing a phenol-containing monomer represented by the general formula (I). The composition according to the present aspect may contain two or more types of acrylated lignins obtained by using different compounds that include acryl groups or methacryl groups to be bound to the phenolated lignin. In addition, the phenolated lignin to be acrylated may be, as described above, one type or a mixture of two or more types manufactured by different synthesis methods (different plant raw materials and/or different phenol compounds) as long as the phenolated lignin contains the phenol-containing monomer represented by the general formula (I) and meets predetermined conditions.

The step of acrylating the phenolated lignin can be conducted by acrylating the phenolated lignin containing the phenol-containing monomer represented by the general formula (I) in accordance with any desired method. As one example of the acrylating step, an approach described in U.S. Pat. Nos. 5,322,753, 5,488,137, and 5,608,010 (Japan Patent No. 3164426), which are cited to constitute part of the present Specification, can be used. Specifically, an acrylated lignophenol having a denaturable lignin skeleton can be obtained by conducting the steps of: dissolving a phenolated lignin and an acrylic acid chloride in a tetrahydrofuran solvent; mixing the phenolated lignin dissolved in the tetrahydrofuran solvent with a sodium hydroxide solution under a reduced pressure and a predetermined temperature condition; and stirring a mixed solution thus obtained. At this time, the reduced pressure condition and the temperature condition may be set at 50 to 150 mmHg and at 50 to 70° C., respectively, but are not limited to these specific conditions. In addition, the stirring time may beset at 1 to 5 hours, but is not limited to any specific time.

The lignin-skeleton-containing acrylic resin composition may contain an initiator for initiating the polymerization reaction of the acrylic monomer. The initiator includes, but is not limited to, 1-hydroxy-cyclohexyl-phenyl-ketone and 2-methyl-1-[4-(methylthio)phenyl]-2-morpholinopropan-1-one. In addition, another publicly-known acrylic polymerization initiator may be added. Note that in the present invention, compounds that can promote cross-linkage and polymerization reactions, including polymerization initiators, are collectively referred to as catalysts.

In addition, the lignin-skeleton-containing acrylic resin composition may mixedly contain an acrylic monomer that does not have a lignin skeleton or a derivative thereof in addition to the above-described acrylated lignin. The acrylic monomer in this case may be any acrylic monomer that is commonly used to obtain an acrylic polymer molded article or a derivative thereof, and includes, for example, 2-ethylhexyl acrylate, 2-hydroxyethyl acrylate, 2-hydroxypropyl acrylate, tetrahydrofurfuryl acrylate, 2-ethylhexyl carbitol acrylate, 3-methoxybutyl acrylate, benzyl acrylate, cyclohexyl acrylate, isoamyl acrylate, isobutyl acrylate, methoxy triethylene glycol acrylate, phenoxy tetraethylene glycol acrylate, cetyl acrylate, isostearyl acrylate, stearyl acrylate, and styrene monomer. There are 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, neopentyl glycol diacrylate, bisphenol A-EO-modified diacrylate, bisphenol F-EO-modified diacrylate, and neopentyl glycol diacrylate. Moreover, the acrylic monomer may also be a mixture of two or more of these. When an acrylic monomer other than the acrylated lignin obtained by acrylating a phenolated lignin containing a phenol-containing monomer represented by the general formula (I) is mixedly present in the resin composition, the acrylated lignin is contained preferably at 50% or more, more preferably at 70% or more, and further preferably at 90% or more in terms of % by mass when the total mass of the base component is taken as 100% Most preferably, in a lignin-skeleton-containing acrylic resin composition, the base component is made up of the acrylated lignin resin at 100%.

The lignin-skeleton-containing acrylic resin composition according to the present aspect may also contain additives as appropriate in accordance with its application. The lignin-skeleton-containing acrylic resin composition can also be used in applications similar to those of the lignin-skeleton-containing epoxy resin composition, and may contain additives similar to, but not limited to, those for the lignin-skeleton-containing epoxy resin composition.

[3] Lignin-Skeleton-Containing Urethane Resin Composition

According to a third aspect, the resin composition containing a lignin skeleton is a lignin-skeleton-containing urethane resin composition. The resin composition according to the present aspect contains a phenolated lignin containing the phenol-containing monomer represented by the general formula (I) described above as a base component, and contains an isocyanate compound as a curing agent. The phenolated lignin and the isocyanate compound can react with each other to form a urethane structure. The lignin-skeleton-containing urethane resin composition may optionally contain a urethanization polymerization catalyst and various additives in addition to the phenolated lignin and the curing agent.

In the third aspect, the phenolated lignin contained in the composition may be, as described above, one type or a mixture of two or more types manufactured by different synthesis methods (different plant raw materials and/or different phenol compounds) as long as the phenolated lignin contains the phenol-containing monomer represented by the general formula (I) and meets predetermined conditions. The present aspect may contain, as a base component, a polyol component other than the phenolated lignin containing the phenol-containing monomer represented by the general formula (I). The polyol may be one that is commonly used as a base component for a urethane resin, and includes, for example, but is not limited to, polyether polyol, polyester polyol, polyalkylene polyol, and polycarbonate polyol. In this case, the phenolated lignin containing the phenol-containing monomer represented by the general formula (I) and serving as the base component is contained preferably at 50% or more, more preferably at 70% or more, and further preferably at 90% or more in terms of % by mass when the total mass of the base component is taken as 100% Most preferably, in the urethane resin composition, the base component is made up of the phenolated lignin at 100%.

The isocyanate compound used as a curing agent may be one commonly used as a curing agent for a urethane resin and is not particularly limited. The isocyanates include aliphatic isocyanates, alicyclic isocyanates, and aromatic isocyanates, and also modified products of these. The aliphatic isocyanates include, for example, hexamethylene diisocyanate, lysine diisocyanate, and lysine triisocyanate, and the alicyclic isocyanates include, for example, isophorone diisocyanate. The aromatic isocyanates include, for example, tolylene diisocyanate, xylylene diisocyanate, diphenylmethane diisocyanate, polymeric diphenylmethane diisocyanate, triphenylmethane triisocyanate, and tris(isocyanatophenyl)thiophosphate. The modified isocyanates include, for example, urethane prepolymer, hexamethylene diisocyanate biuret, hexamethylene diisocyanate, trimer, and isophorone diisocyanate trimer. Only one type or two or more types of these may be contained. Any of these isocyanate compounds can form a cross-linkage structure and makes it possible to obtain a curable lignin resin. For example, from the viewpoint of voltage resistance and heat resistance for use as a mold for electronic devices, alicyclic isocyanates and aromatic isocyanates are preferably used. The amount of a curing agent made up of an isocyanate compound to be added is preferably 1.0 to 10.0 equivalents, and is further preferably 2.0 to 5.5 equivalents, to the base component.

In the curing reaction of the urethane-structure-containing lignin resin in the present aspect, a publicly-known urethanization catalyst such as amines and organometallic compounds, for example, may be added as necessary in the above-described polymerization reaction. The amines include tertiary amines such as triethylamine, triethylenediamine, bis(2-di methylaminoethyl)ether, and N-methyl morpholine, for example, quaternary ammonium salts such as tetraethyl hydroxyl ammonium, for example, and imidazoles such as imidazole and 2-ethyl-4-methylimidazole, for example. The organometallic compounds includes organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate, dibutyltin dineodecanoate, dioctyltin dimercaptide, dioctyltin dilaurate, and dibutyltin dichloride, for example, organic lead compounds such as lead octanoate and lead naphthenate, for example, organic nickel compounds such as nickel naphthenate, for example, organic cobalt compounds such as cobalt naphthenate, for example, organic copper compounds such as copper octenoate, for example, and organic bismuth compounds such as bismuth octylate and bismuth neodecanoate, for example.

Various additives may be added also to the urethane-structure-containing lignin resin in accordance with its application for usage. For example, when the urethanestructure-containing lignin resin is used as a molding resin for a molded transformer, additives such as a flexibilizer, a flame retardant, a colorant, an antioxidant, and an inorganic filler may be further added. In addition, when the urethane-structure-containing lignin resin is used as an encapsulant for a semiconductor device, additives may include, but are not limited to, an inorganic filler, a flame retardant, a pigment for coloring the resin, and a plasticizer and a silicone elastomer for improving the crack resistance. The amounts of these to be added may be determined by those skilled in the art as appropriate in accordance with the specifications required for semiconductor devices and/or encapsulants.

The urethane-structure-containing lignin resin according to the present aspect can be cured into a molded article, and particularly can be favorably used as a molding resin for a molded article formed in a mold.

[4] Lignin-Skeleton-Containing Phenolic Resin Composition

According to a fourth aspect, the resin composition containing a lignin skeleton is a lignin-skeleton-containing phenolic resin composition. The resin composition according to the present aspect contains a phenolated lignin containing the phenol-containing monomer represented by the general formula (I) described above as a base component, and contains an aldehyde compound as a curing agent. The phenolated lignin and the aldehyde compound can react with each other to form an aldehyde compound-derived cross-linkage structure, and make it possible to obtain a phenolic resin. The lignin-skeleton-containing phenolic resin composition may optionally contain a polymerization catalyst and various additives in addition to the phenolated lignin and the curing agent.

In the fourth aspect, the phenolated lignin contained in the composition may be, as described above, one type or a mixture of two or more types manufactured by different synthesis methods (different plant raw materials and/or different phenol compounds) as long as the phenolated lignin contains the phenol-containing monomer represented by the general formula (I) and meets predetermined conditions. The present aspect may contain, as a base component, a phenolic compound other than the phenolated lignin containing the phenol-containing monomer represented by the general formula (I). The phenolic compound may be one that is commonly used as a base component for a phenolic resin, and includes, for example, but is not limited to, phenol, 3,5-xylenol, m-cresol, 2,5-xylenol, 3,4-xylenol, 2,4-xylenol, o-xylenol, and p-cresol. In this case, the phenolated lignin containing the phenol-containing monomer represented by the general formula (I) and serving as the base component is contained preferably at 50% or more, more preferably at 70% or more, and further preferably at 90% or more, in terms of % by mass when the total mass of the base component is taken as 100% Most preferably, in the phenolic resin composition, the base component is made up of the phenolated lignin at 100%.

The aldehyde compound used as a curing agent may be one commonly used as a curing agent for a phenolic resin and is not particularly limited. The aldehyde compound includes, for example, formaldehyde, paraformaldehyde, trioxane, acetaldehyde, propionaldehyde, polyoxymethylene, chloral, hexamethylenetetramine, furfural, glyoxal, n-butyraldehyde, caproaldehyde, allylaldehyde, benzaldehyde, crotonaldehyde, acrolein, tetraoxymethylene, phenylacetaldehyde, o-tolualdehyde, salicylaldehyde, and paraxylene dimethyl ether. Preferably, the aldehyde compound is formaldehyde, paraformaldehyde, trioxane, polyoxymethylene, acetaldehyde, and paraxylene dimethyl ether. These may be used solely or as a combination of two types or more. The amount of a curing agent made up of an aldehyde compound to be added is preferably 0.75 to 1.5 equivalents, and further preferably 0.9 to 1.2 equivalents, to the base component.

In the curing reaction of the phenol-structure-containing lignin resin in the present aspect, a publicly-known polymerization catalyst that can be used in manufacture of a phenolic resin may be added as necessary in the polymerization reaction. The catalyst includes, for example, but is not limited to, sodium hydroxide, potassium hydroxide, hexamethylenetetramine, trimethylamine, hydrochloric acid, and formic acid.

Various additives may be added to the lignin-skeleton-containing phenolic resin composition in accordance with its application for usage. For example, when the lignin-skeleton-containing phenolic resin composition is used as a molding resin for a molded transformer, additives such as a flexibilizer, a flame retardant, a colorant, an antioxidant, and an inorganic filler may be further added.

When the lignin-skeleton-containing phenolic resin composition is used as an encapsulant for a semiconductor device, additives may include, but are not limited to, an inorganic filler, a flame retardant, a pigment for coloring the resin, and a plasticizer and a silicone elastomer for improving the crack resistance. The amounts of these to be added may be determined by those skilled in the art as appropriate in accordance with the specifications required for semiconductor devices and/or encapsulants.

The phenolic resin composition according to the present aspect can be cured into a molded article, and particularly can be favorably used as a molding resin for a molded article formed in a mold.

Second Embodiment: Molded Article, Molded Transformer, Semiconductor Device, Switchgear According to a second embodiment, the present invention relates to a lignin resin molded article obtained by curing the resin composition containing a lignin skeleton according to the first embodiment, or to a molded article formed in a mold, particularly an electronic device in which a member containing a metal material and/or a ceramic material is encapsulated with the resin composition containing a lignin skeleton. The molded article formed in a mold may typically be a molded transformer, a semiconductor device, or a switchgear. Moreover, examples of the molded article formed in a mold include electric power instruments, for example, a gas insulated switchgear, for automobiles, vehicles, aircraft, ships, automatic vending machine, air conditioners, power generators, and the like, but is not particularly limited. Note that the molded article formed in a mold according to the present embodiment may be any molded article in which a member containing a metal material and/or a ceramic material and a post-reaction product of the resin composition containing a lignin skeleton have been integrated, and is not limited to a mode in which the entirety of a metal material or another material is fully covered and encapsulated with the lignin resin composition. After the manufacture of a molded article, it is possible to analyze, using the infrared absorption spectrometry and the gas chromatograph mass spectrometer, that a compound constituting the resin molded article is based on the composition of the first embodiment of the present invention.

When the resin composition is a thermosetting resin, the resin molded article can be obtained by curing and molding the resin composition according to the first embodiment by any desired method. The curing conditions are preferably such that curing is conducted at a temperature of 100 to 250° C. for approximately 3 to 10 hours, for example; however, the method is not limited by particular curing conditions. In addition, a two-stage curing may be employed, and in this case, curing may be conducted at a temperature of 100 to 150° C. for 1 to 5 hours, and then at a temperature of 150 to 200° C. for approximately 3 to 5 hours, for example. Note that when the resin composition is a thermosetting resin, the molded article and the cured product refer to the same thing. Alternatively, when the resin composition is a thermoplastic resin, the resin molded article can be obtained by pouring a post-reaction product of a fluid resin composition into a certain mold, frame, case, or the like, followed by cooling.

The molded transformer according to the present embodiment includes a resin molded coil and an iron core which is inserted through a core portion. The resin molded coil includes: a cylindrical core portion; a coil conductor which is wound around the outer periphery of the core portion into many layers; an insulation sheet which insulates layers of the coil conductor from each other; and a thermosetting resin which molds the periphery of the coil conductor. This thermosetting resin may be made up of the resin composition according to the second embodiment. Note that the molded transformer may have configurations of JP 2015-211132 A, JP 2014-204002A, and the like, but is not particularly limited. The lignin resin composition can be used as a molding resin in any molded transformer.

The resin molded article according to the present embodiment is stable under a temperature condition for use for general molded transformers and under environmental conditions for use, and can maintain electrical insulation over a long period of time. Specifically, the average temperature rise of coil conductors of molded transformers is approximately 90 to 95 K from ordinary temperature, and the environment for use does not turn into an alkaline condition in general. On the other hand, the molded article can be decomposed under mild conditions, for example, at a relatively low temperature of 160° C. or less and preferably 150° C. or less by a recycling method described later. For these reasons, it becomes possible to decompose and remove cured resin products or resin molded articles from molded transformers, which have conventionally been discarded as industrial waste, and to recycle other members that contain at least metal materials.

A semiconductor device according to the present embodiment is formed by connecting a semiconductor element mounted on a multi layer substrate and an output terminal through an electrically-conductive connection member, and encapsulating these components with an encapsulating resin. In the present embodiment, the encapsulating resin may be made up of the resin composition according to the first embodiment. Known configurations of semiconductor devices include those using metal wires, lead frames, metal pins, and the like as electrically-conductive connection members, and also various forms are known as to the types and arrangements of semiconductor elements. The resin composition according to the first embodiment of the present invention can be used as an encapsulating resin in any forms of semiconductor devices.

The resin molded article according to the present embodiment can also maintain a high glass transition temperature of 200° C. or more. Accordingly, the resin molded article according to the present invention is useful also as an encapsulant for the case of using a SiC semiconductor element and the like, which generate a large amount of heat, and can maintain an electrical insulation over a long period of time. The temperature of the encapsulating resin during the use of a semiconductor device sometimes increases locally up to 200° C. or more; however, the encapsulating resin is not exposed to an alkaline solution. Accordingly, the encapsulating resin is not decomposed under normal conditions of use. On the other hand, it becomes possible to decompose and remove the encapsulant including a molded article under relatively mild conditions, for example, at a relatively low temperature of 160° C. or less, and preferably 150° C. or less, and to recycle other members that contain at least metal materials, by the recycling method described later.

The switchgear according to the present embodiment includes a plurality of arc-extinguishing chambers arranged in a container, and the insides of the container and the plurality of arc-extinguishing chambers are filled with an arc-extinguishing gas such as the SF6 gas. In addition, the outer side of the container is molded with the resin composition according to the first embodiment of the present invention. The switchgear may have a configuration disclosed in JP 2017-21997 A with forms in which the outer side of the container is molded with the resin composition according to the first embodiment of the present invention, but is not limited to these. In a switchgear having any desired configuration, it is possible to cover the outer side of a container with the resin composition according to the first embodiment to maintain the insulation property. The switchgear according to the present embodiment has advantages that the size of the entire device can be reduced and space saving can be achieved, as compared with switchgears according to conventional techniques.

The resin molded article according to the present embodiment can maintain a high glass transition temperature of 200° C. or more. Accordingly, the resin molded article according to the present embodiment can exist stably under the conditions of use of a switchgear, and can maintain the electrical insulation over a long period of time. In the case of switchgears as well, the environment for use does not turn into an alkaline condition in general. On the other hand, the molded article can be decomposed under mild conditions, for example, at a relatively low temperature of 160° C. or less, and preferably 150° C. or less, by the recycling method described later. For these reasons, it becomes possible to decompose and remove the cured resin product or the resin molded article from used switchgears, and to recycle other members that contain at least metal materials.

Third Embodiment: Recycling Method for Metal Material Contained in Molded Article Formed in a Mold According to the third embodiment, the present invention relates to a recycling method for a metal material and/or a ceramic material contained in a molded article formed in a mold. This method includes the step of processing the molded article formed in a mold at 120 to 150° C. in an alkaline solution. Specific subjects to be recycled may be, but are not limited to, members included in the molded transformer, the semiconductor device, and the switchgear illustrated in the second embodiment, which contain at least a metal material and/or a ceramic material, and may also contain glass, fiber materials, and the like. In addition, the metal material contained in such a molded article formed in a mold in general includes, but is not limited to, Cu, Fe, Al, Ni, Sn, Au, Ag, and Ti, and alloys of these.

Prior to the processing step, the recycling method may optionally include the step of pulverizing a molded article formed in a mold by using a pulverizer. In this case, the size for pulverization may be selected as appropriate depending on the type, size, shape, and the like of a substance to be recycled. In addition, when the molded article formed in a mold contains metal fine particles, for example, the molded article formed in a mold may be pulverized into a particle size having a diameter of about 100 µm or less.

In the processing step, it is possible to easily decompose the resin molded article by immersing a molded article formed in a mold or a pulverized molded article formed in a mold preferably into an aqueous solution of an alkali metal compound, followed by heating to a predetermined temperature in the immersed state. As the alkali metal compound, it is possible to use compounds containing alkali metals such as lithium, sodium, potassium, and cesium, hydrides, hydroxides, and chlorides of lithium, sodium, potassium, cesium, and the like. In addition, this aqueous solution may contain 0.5 to 5.0 equivalents of an alkali metal compound and 1000 g of water relative to 10 g of a resin molded article. Typically, a sodium hydroxide aqueous solution can be used, but the aqueous solution is not limited to these.

At this time, the processing temperature and the processing time preferably are 100 to 150° C. and 1 to 5 hours, respectively. Heating means is not particularly limited, but may be an autoclave or the like. Moreover, during the heating, it is preferable to stir the aqueous solution of the alkali metal compound. Such operations allow a resin molded article firmly attached to a metal material and/or a ceramic material or glass, fiber materials, or the like to be decomposed and removed. A remaining metal material and/or ceramic material and the like can be separated, sorted, and reused by any desired publicly-known methods.

EXAMPLES

Hereinafter, the present invention is described in further detail by giving Examples of the present invention. However, the present invention is not limited to the scope of the following Examples.
(Lignin-Skeleton-Containing Epoxy Resin Molded Article (Cured Product))

Example 1

(Synthesis of Lignophenol)
As a plant raw material, a rice straw that contains syringol at a mole fraction of 42% in a lignin molecule structure was used, and synthesis was conducted by the following approach disclosed in JP 2010-159381A. Specifically, to 100 g of a rice straw degreased powder, an acetone solution containing 3 mol of p-cresol per C9 unit of lignin in this rice straw was added, and left to stand for one night to impregnate the rice straw powder with p-cresol. Thereafter, the wood powder was thinly spread on a vat and left to stand in fumehood until the acetone odor disappeared, to distill acetone. The amount of the C9 unit of lignin in the rice straw degreased powder was calculated based on elemental analysis of lignin in the rice straw degreased powder.

Next, 400 ml of 72% sulfuric acid was added to the entire amount, which was then immersed into a water bath at 30° C., followed by intense stirring for 60 minutes. After a predetermined time elapsed, the stirring was stopped, and a reaction solution was added to a large excess of ion exchanged water being cooled while intensely stirring in order to stop the reaction, so that the total amount was adjusted to 4000 ml. After about 60 minutes, the stirring was stopped, and an undissolved product was separated by centrifugation. This undissolved product was repeatedly washed with ion exchanged water until the pH became approximately 7, and then precipitate was dried in a dryer at 60° C., and further, was dried on di phosphorus pentoxide under a reduced pressure. The precipitate thus dried was extracted with 300 ml of acetone, and after centrifugation, a supernatant was obtained as a lignocresol-acetone solution. This lignocresol-acetone solution was dropped little by little into a large excess of diethyl ether. A fraction of precipitation was recovered by centrifugation and washed with diethyl ether. Thereafter, a solvent was distilled to dryness to obtain rice straw-derived lignocresol.
(Synthesis of Epoxidized Lignin)
First, 50 g of lignocresol synthesized as described above and 1000 g of epichlorohydrin were mixed in a reactor, followed by stirring until lignocresol was completely dissolved in epichlorohydrin (serving as both a solvent and a reaction reagent). After the dissolving, the pressure inside the reactor was reduced to 100 mmHg and the temperature inside the reactor was adjusted to 55 to 60° C. using an oil bath, followed by causing reflux inside the reactor. After the temperature and the pressure inside the reactor became constant, 17.5 g of 20% NaOH aqueous solution was dropped little by little using a dropping funnel to start epoxidation reaction. Reaction was continued for 2 hours after the start of the dropping, a solution thus obtained was filtrated, and a filtrated solution was subjected to evaporation and vacuum drying, so that a solvent was distilled to dryness to obtain an epoxidized lignin. The epoxidized lignin obtained in Example 1 had a structure in which epoxy groups were bound to some OH groups in the lignocresol and had a cross-linkability as an epoxy compound.
(Fabrication of Lignin-Skeleton-Containing Epoxy Resin Molded Article)
First, 50 g of the epoxidized lignin synthesized as described above was dissolved in 200 ml of acetone, and 4 phr of 2-ethyl-4-methylimidazole (2E4M Z) was added as a curing catalyst (curing accelerator), followed by stirring. This mixed solution was subjected to evaporation and vacuum drying, so that the solvent was distilled to dryness to obtain a mixture of the epoxidized lignin and the curing catalyst. This mixture was placed in a desired mold, and heated at 100° C. for 2 hours (precuring) and then at 140° C. for 4 hours (postcuring) to obtain a lignin-skeleton-containing epoxy resin molded article, which was a cured product of the epoxidized lignin.
(Evaluation of Thermal Fluidity)
To confirm the molding fluidity of the epoxidized lignin, the softening point temperature was measured using a thermomechanical analyzer (TMA-6100 manufactured by SII Nano Technology Inc.) under ambient atmosphere at a temperature increasing rate of 5° C./min and with a load of 1.0 g to confirm the presence or absence of the thermal fluidity at 100° C. or less.
(Evaluation of Degradability)
The lignin-skeleton-containing epoxy resin molded article prepared as described above was formed into a test piece having a size of diameter of 10 mm×a thickness of 3 mm. The test piece was immersed into a 1.0 N sodium hydroxide aqueous solution, and heated at predetermined temperatures (110, 120, 130, 140, and 150° C.) for 1 hour using an autoclave to evaluate the degradability of the molded article (cured product).

Example 2

An epoxidized lignin was prepared in the same manner as in Example 1 except that 3 mol of p-cresol, which was to be added in the synthesis of lignophenol, was changed to a mixture of 2 mol of p-cresol and 1 mol of 2,6-xylenol in Example 1. The epoxidized lignin obtained in Example 2 had a structure in which epoxy groups were bound to some OH groups in the lignocresol and/or the lignoxylenol and had a cross-linkability as an epoxy compound. Using this epoxidized lignin, a lignin-skeleton-containing epoxy resin molded article was fabricated in the same manner as in Example 1, and the thermal fluidity and the degradability were evaluated in the same manner as in Example 1.

Example 3

A lignin-skeleton-containing epoxy resin molded article was fabricated in the same manner as in Example 1 except that 3 mol of p-cresol, which was to be added in the synthesis of lignophenol, was changed to a mixture of 1 mol of p-cresol and 2 mol of 2,6-xylenol in Example 1. Then, the thermal fluidity and the degradability were evaluated in the same manner as in Example 1.

Example 4

A lignin-skeleton-containing epoxy resin molded article was fabricated in the same manner as in Example 1 except that 3 mol of p-cresol, which was to be added in the synthesis of lignophenol, was changed to a mixture of 0.9 mol of p-cresol and 2.1 mol of 2,6-xylenol in Example 1. Then, the thermal fluidity and the degradability were evaluated in the same manner as in Example 1.

Example 5

A lignin-skeleton-containing epoxy resin molded article was fabricated in the same manner as in Example 1 except that 3 mol of p-cresol, which was to be added in the synthesis of lignophenol, was changed to a mixture of 0.75 mol of p-cresol and 2.25 mol of 2,6-xylenol in Example 1. Then, the thermal fluidity and the degradability were evaluated in the same manner as in Example 1.

Example 6

A lignin-skeleton-containing epoxy resin molded article was attempted to be fabricated in the same manner as in Example 1 except that the plant raw material was changed to *Tsuga heterophylla* (a conifer), which does not contain syringol, in Example 1.
(Lignin-Skeleton-Containing Urethane Resin Molded Article (Cured Product))

Example 7

(Synthesis of Lignophenol)
The synthesis of lignophenol was conducted in the same manner as in Example 1 to obtain a rice straw-derived lignocresol.
(Fabrication of Lignin-Skeleton-Containing Urethane Resin Molded Article)
Using 50 g of the lignocresol, which was synthesized as described above, as a base component, 15 g of diphenylmethane di isocyanate, Millionate MTL (manufactured by Tosoh Corporation) was added as an isocyanate curing agent and blended such that the NCO/OH equivalent ratio became 1. Further, 0.03 g of dioctyltin dilaurate, Neostan U810 (manufactured by Nitto Kasei Co., Ltd.) was added as a polymerization catalyst and stirred to prepare a lignin-skeleton-containing urethane resin composition. This composition was placed in a desired mold, and heated at 100° C. for 30 hours to obtain a lignin-skeleton-containing urethane resin molded article. The lignin-skeleton-containing urethane resin molded article thus obtained had a urethane structure in which some of OH groups contained in the lignophenol were bound to isocyanate groups to form urethane bonds.
(Evaluation of Thermal Fluidity and Degradability)
The molding fluidity of the lignocresol was evaluated by measuring the softening point temperature in the same manner as in Example 1. In addition, the degradability of the lignin-skeleton-containing urethane resin molded article was also evaluated in the same manner as in Example 1.

Example 8

A lignin-skeleton-containing urethane resin molded article was fabricated in the same manner as in Example 7 except that 3 mol of p-cresol, which was to be added in the synthesis of lignophenol, was changed to a mixture of 2 mol of p-cresol and 1 mol of 2,6-xylenol in Example 7. Then, the thermal fluidity and the degradability were evaluated in the same manner as in Example 7.

Example 9

A lignin-skeleton-containing urethane resin molded article was fabricated in the same manner as in Example 7 except that 3 mol of p-cresol, which was to be added in the synthesis of lignophenol, was changed to a mixture of 1 mol of p-cresol and 2 mol of 2,6-xylenol in Example 7. Then, the thermal fluidity and the degradability were evaluated in the same manner as in Example 7.

Example 10

A lignin-skeleton-containing urethane resin molded article was fabricated in the same manner as in Example 7 except that 3 mol of p-cresol, which was to be added in the synthesis of lignophenol, was changed to a mixture of 0.9 mol of p-cresol and 2.1 mol of 2,6-xylenol in Example 7. Then, the thermal fluidity and the degradability were evaluated in the same manner as in Example 7.

Example 11

A lignin-skeleton-containing urethane resin molded article was fabricated in the same manner as in Example 7 except that 3 mol of p-cresol, which was to be added in the synthesis of lignophenol, was changed to a mixture of 0.75 mol of p-cresol and 2.25 mol of 2,6-xylenol in Example 7. Then, the thermal fluidity and the degradability were evaluated in the same manner as in Example 7.
(Lignin-Skeleton-Containing Acrylic Resin Molded Article)

Example 12

(Synthesis of Lignophenol)
The synthesis of lignophenol was conducted in the same manner as in Example 1 to obtain a rice straw-derived lignocresol.
(Synthesis of Acrylated Lignin)
First, 50 g of the lignocresol synthesized as described above was dissolved in 400 ml of tetrahydrofuran, which was then cooled down to 5° C., and 120 g of a 12% NaOH aqueous solution was added dropwise under a nitrogen atmosphere. Then, 22 g of acryloyl chloride was dropped into this solution, taking 60 minutes, followed by stirring for 2 hours to complete the reaction. This reaction liquid was poured into water and extracted with a toluene solvent. This extract was washed with an aqueous solution of sodium carbonate and water. Thereafter, toluene was removed from the solution, and a resultant was refined by a column chromatography process. An amount of n-hexane was added to and crystallized this solution, and the solvent was distilled to dryness by vacuum drying to obtain an acrylated lignin. The acrylated lignin thus obtained had a structure in which H atoms were removed from some OH groups in the lignocresol and acryloyl groups ($H_2C=CH—C(=O)—$) were bound thereto, and had a cross-linkability as an acrylic monomer.

(Fabrication of Lignin-Skeleton-Containing Acrylic Resin Molded Article)

First, 50 g of the acrylated lignin synthesized as described above was dissolved in 200 ml of tetrahydrofuran, and 3 phr of Perbutyl O (manufactured by NOF Corporation) was added thereto as a thermal polymerization catalyst, followed by stirring. This mixed solution was subjected to evaporation and vacuum drying, so that the solvent was distilled to dryness to obtain a mixture of the acrylated lignin and the thermal polymerization catalyst. This mixture was placed in a desired mold, and heated at 100° C. for 16 hours to obtain a lignin-skeleton-containing acrylic resin molded article, which was a polymer of the acrylated lignin.

(Evaluation of Thermal Fluidity and Degradability)

The molding fluidity of the acrylated lignin was evaluated by measuring the softening point temperature in the same manner as in Example 1. In addition, the degradability of the lignin-skeleton-containing acrylic resin molded article was also evaluated in the same manner as in Example 1.

Example 13

A lignin-skeleton-containing acrylic resin molded article was fabricated in the same manner as in Example 12 except that 3 mol of p-cresol, which was to be added in the synthesis of lignophenol, was changed to a mixture of 2 mol of p-cresol and 1 mol of 2,6-xylenol in Example 12. Then, the thermal fluidity and the degradability were evaluated in the same manner as in Example 12.

Example 14

A lignin-skeleton-containing acrylic resin molded article was fabricated in the same manner as in Example 12 except that 3 mol of p-cresol, which was to be added in the synthesis of lignophenol, was changed to a mixture of 1 mol of p-cresol and 2 mol of 2,6-xylenol in Example 12. Then, the thermal fluidity and the degradability were evaluated in the same manner as in Example 12.

Example 15

A lignin-skeleton-containing acrylic resin molded article was fabricated in the same manner as in Example 12 except that 3 mol of p-cresol, which was to be added in the synthesis of lignophenol, was changed to a mixture of 0.9 mol of p-cresol and 2.1 mol of 2,6-xylenol in Example 12. Then, the thermal fluidity and the degradability were evaluated in the same manner as in Example 12.

Example 16

A lignin-skeleton-containing acrylic resin molded article was fabricated in the same manner as in Example 12 except that 3 mol of p-cresol, which was to be added in the synthesis of lignophenol, was changed to a mixture of 0.75 mol of p-cresol and 2.25 mol of 2,6-xylenol in Example 12. Then, the thermal fluidity and the degradability were evaluated in the same manner as in Example 12.

(Lignin-Skeleton-Containing Phenolic Resin Molded Article (Cured Product))

Example 17

(Synthesis of Lignophenol)

The synthesis of lignophenol was conducted in the same manner as in Example 1 to obtain a rice straw-derived lignocresol.

(Fabrication of Lignin-Skeleton-Containing Phenolic Resin Molded Article)

First, 50 g of the lignocresol synthesized as described above was dissolved in 400 ml of tetrahydrofuran, and 17 g of heamethylenetetramine (manufactured by Wako Pure Chemical Industries, Ltd.) was added as an amine-based curing agent, followed by stirring. This mixed solution was subjected to evaporation and vacuum drying, so that the solvent was distilled to dryness to obtain a mixture of the phenolated lignin and the curing agent. This was placed in a desired mold, and heated at 120° C. for 5 hours and then at 150° C. for 3 hours to obtain a lignin-skeleton-containing phenolic resin molded article. The lignin-skeleton-containing phenolic resin molded article thus obtained was such that some of OH groups contained in the lignocresol were bound to hexamethylenetetramine, and had a cross-linkage structure derived from hexamethylenetetramine between the lignocresols.

(Evaluation of Thermal Fluidity and Degradability)

The molding fluidity of the lignocresol was evaluated by measuring the softening point temperature in the same manner as in Example 1. In addition, the degradability of the lignin-skeleton-containing phenolic resin molded article was also evaluated in the same manner as in Example 1.

Example 18

A lignin-skeleton-containing phenolic resin molded article was fabricated in the same manner as in Example 17 except that 3 mol of p-cresol, which was to be added in the synthesis of lignophenol, was changed to a mixture of 2 mol of p-cresol and 1 mol of 2,6-xylenol in Example 17. Then, the thermal fluidity and the degradability were evaluated in the same manner as in Example 17.

Example 19

A lignin-skeleton-containing phenolic resin molded article was fabricated in the same manner as in Example 17 except that 3 mol of p-cresol, which was to be added in the synthesis of lignophenol, was changed to a mixture of 1 mol of p-cresol and 2 mol of 2,6-xylenol in Example 17. Then, the thermal fluidity and the degradability were evaluated in the same manner as in Example 17.

Example 20

A lignin-skeleton-containing phenolic resin molded article was fabricated in the same manner as in Example 17 except that 3 mol of p-cresol, which was to be added in the synthesis of lignophenol, was changed to a mixture of 0.9 mol of p-cresol and 2.1 mol of 2,6-xylenol in Example 17.

Then, the thermal fluidity and the degradability were evaluated in the same manner as in Example 17.

Example 21

A lignin-skeleton-containing phenolic resin molded article was fabricated in the same manner as in Example 17 except that 3 mol of p-cresol, which was to be added in the synthesis of lignophenol, was changed to a mixture of 0.75 mol of p-cresol and 2.25 mol of 2,6-xylenol in Example 17. Then, the thermal fluidity and the degradability were evaluated in the same manner as in Example 17.

Comparative Example 1

A lignin-skeleton-containing epoxy resin molded article of Comparative Example was fabricated in the same manner as in Example 1 except that 3 mol of p-cresol, which was to be added in the synthesis of lignophenol, was changed to 3 mol of 2,6-xylenol in Example 1. Then, the thermal fluidity and the degradability were evaluated in the same manner as in Example 1.

Comparative Example 2

A lignin-skeleton-containing urethane resin molded article of Comparative Example was fabricated in the same manner as in Example 7 except that 3 mol of p-cresol, which was to be added in the synthesis of lignophenol, was changed to 3 mol of 2,6-xylenol in Example 7. Then, the thermal fluidity and the degradability were evaluated in the same manner as in Example 7.

Comparative Example 3

A lignin-skeleton-containing acrylic resin molded article of Comparative Example was fabricated in the same manner as in Example 12 except that 3 mol of p-cresol, which was to be added in the synthesis of lignophenol, was changed to 3 mol of 2,6-xylenol in Example 12. Then, the thermal fluidity and the degradability were evaluated in the same manner as in Example 12.

Comparative Example 4

A lignin-skeleton-containing phenolic resin molded article of the Comparative Example was fabricated in the same manner as in Example 17 except that 3 mol of p-cresol, which was to be added in the synthesis of lignophenol, was changed to 3 mol of 2,6-xylenol in Example 17. Then, the thermal fluidity and the degradability were evaluated in the same manner as in Example 17.

Comparative Example 5

First, 50 g of bisphenol A epoxy, JER828 (manufactured by Japan Epoxy Resin Co., Ltd.) and 4 phr of imidazole (2E4M Z) as a curing catalyst were added and stirred. This mixture was placed in a desired mold, and heated at 100° C. for 2 hours (precuring) and then at 140° C. for 4 hours (postcuring) to obtain an epoxy resin molded article that did not contain a lignin skeleton.

Comparative Example 6

First, 14 g of diphenylmethane diisocyanate, Millionate MTL (manufactured by Tosoh corporation) was added as a polyisocyanate curing agent to 50 g of polyoxypropylene glycol, SANNIX PP1000 (manufactured by Sanyo Chemical Industries, Ltd.) and was blended such that the NCO/OH equivalent ratio became 1. Further, 0.03 g of dioctyltin dilaurate, Neostan U810 (manufactured by Nitto Kasei Co., Ltd.) was added as a polymerization catalyst and stirred to prepare a urethane resin composition. This was placed in a desired mold, and heated at 100° C. for 30 hours to obtain a urethane resin molded article that did not contain a lignin skeleton.

Comparative Example 7

First, 3 phr of Perbutyl O (manufactured by NOF Corporation) was added as a thermal polymerization catalyst to 50 g of nonanediol diacrylate, FA 129AS (manufactured by Hitachi Chemical Co., Ltd.) and stirred. This mixture was placed in a desired mold, and heated at 100° C. for 16 hours to obtain an acrylic resin molded article that did not contain a lignin skeleton.

Comparative Example 8

First, 50 g of phenol novolac, TD-2131 (manufactured by DIC Corporation) was dissolved in 400 ml of tetrahydrofuran and 15 g of hexamethylenetetramine (manufactured by Wako Pure Chemical Industries, Ltd.) was added as an amine-based curing agent, followed by stirring. This mixed solution was subjected to evaporation and vacuum drying, so that the solvent was distilled to dryness to obtain a mixture of the phenolic resin and the curing agent. This was placed in a desired mold, and heated at 120° C. for 5 hours and then at 150° C. for 3 hours to obtain a phenolic resin molded article that did not contain a lignin skeleton.

Results are shown in Table 1 below. In Table 1, the thermal fluidity was expressed by "○" when the softening point temperature of the resin composition before molding (curing) was 100° C. or less and by "x" when softening was not observed at 100° C. or less. In addition, the degradability was expressed by "○" when the molded article weight (cured product weight) decrease rate was 10% or more and by "x" when the molded article weight (cured product weight) decrease rate was less than 10% Note that the molded article weight decrease rate (%) is defined by (the mass of the molded article (solid component) 1 hour after the start of the process)/(the total mass of the molded article before the process)×100 where the molded article weight decrease rate (%) when the test piece was immersed in a sodium hydroxide aqueous solution and heating was started is taken as 0. In addition, in the table, the lignocresol content ratio means the amount, represented by %4 of the mole fraction of the phenol-containing monomer in which the group represented by (A) in the formula (I) is cresol when the total amount of the molar amount of the phenol-containing monomer in which the group represented by (A) in the formula (I) is cresol and the molar amount of the phenol-containing monomer in which the group represented by (A) in the formula (I) was xylenol is taken as 100. Similarly, the lignoxylenol content ratio means the amount, represented by 04 of the mole fraction of the phenol-containing monomer in which the group represented by (A) in the formula (I) is xylenol when the total amount of the molar amount of the phenol-containing monomer in which the group represented by (A) in the formula (I) is cresol and the molar amount of the phenol-containing monomer in which the group represented by (A) in the formula (I) was xylenol is taken as 100.

TABLE 1

| | Raw Material | Lignocresol Content Ratio | Lignoxylenol Content Ratio | Type of Resin Composition | Fluidity | Degradability 110° C. | 120° C. | 130° C | 140° C. | 150° C. |
|---|---|---|---|---|---|---|---|---|---|---|
| Example 1 | Rice Straw | 100 | 0 | Epoxy | o | x | o | o | o | o |
| Example 2 | Rice Straw | 67 | 33 | Epoxy | o | x | x | x | o | o |
| Example 3 | Rice Straw | 33 | 67 | Epoxy | o | x | x | x | o | o |
| Example 4 | Rice Straw | 30 | 70 | Epoxy | o | x | x | x | x | o |
| Example 5 | Rice Straw | 25 | 75 | Epoxy | o | x | x | x | x | x |
| Example 6 | *Tsuga heterophylla* | 100 | 0 | Epoxy | x | — | — | — | — | — |
| Example 7 | Rice Straw | 100 | 0 | Urethane | o | x | o | o | o | o |
| Example 8 | Rice Straw | 67 | 33 | Urethane | o | x | x | x | o | o |
| Example 9 | Rice Straw | 33 | 67 | Urethane | o | x | x | x | o | o |
| Example 10 | Rice Straw | 30 | 70 | Urethane | o | x | x | x | x | o |
| Example 11 | Rice Straw | 25 | 75 | Urethane | o | x | x | x | x | x |
| Example 12 | Rice Straw | 100 | 0 | Acryl | o | x | o | o | o | o |
| Example 13 | Rice Straw | 67 | 33 | Acryl | o | x | x | x | o | o |
| Example 14 | Rice Straw | 33 | 67 | Acryl | o | x | x | x | o | o |
| Example 15 | Rice Straw | 30 | 70 | Acryl | o | x | x | x | x | o |
| Example 16 | Rice Straw | 25 | 75 | Acryl | o | x | x | x | x | x |
| Example 17 | Rice Straw | 100 | 0 | Phenol | o | x | o | o | o | o |
| Example 18 | Rice Straw | 67 | 33 | Phenol | o | x | x | x | o | o |
| Example 19 | Rice Straw | 33 | 67 | Phenol | o | x | x | x | o | o |
| Example 20 | Rice Straw | 30 | 70 | Phenol | o | x | x | x | x | o |
| Example 21 | Rice Straw | 25 | 75 | Phenol | o | x | x | x | x | x |
| Comparative Example 1 | Rice Straw | 0 | 100 | Epoxy | o | x | x | x | x | x |
| Comparative Example 2 | Rice Straw | 0 | 100 | Urethane | o | x | x | x | x | x |
| Comparative Example 3 | Rice Straw | 0 | 100 | Acryl | o | x | x | x | x | x |
| Comparative Example 4 | Rice Straw | 0 | 100 | Phenol | o | x | x | x | x | x |
| Comparative Example 5 | Commercially-Available Epoxy | 0 | 100 | Epoxy | o | x | x | x | x | x |
| Comparative Example 6 | Commercially-Available Urethane | 0 | 100 | Urethane | o | x | x | x | x | x |
| Comparative Example 7 | Commercially-Available Acryl | 0 | 100 | Acryl | o | x | x | x | x | x |
| Comparative Example 8 | Commercially-Available Phenol | 0 | 100 | Phenol | o | x | x | x | x | x |

Examples 1 to 5 and 7 to 21 all had thermal fluidity at low temperatures of 100° C. or less, and were thus favorable in moldability and capable of being fabricated into molded articles. Further, Examples 1 to 4, 7 to 10, 12 to 15, and 17 to 20 all exhibited favorable degradability at low temperatures of 120 to 150° C. under an alkaline aqueous solution. Examples 5, 11, 16, and 21 also exhibited degradability with heating at 160° C. under an alkaline aqueous solution. On the other hand, Example 6 did not have thermal fluidity at 100° C. or less and was incapable of being fabricated into a molded article. In addition, in Comparative Examples 1 to 8, it was impossible to decompose the molded articles in a temperature range of 110 to 150° C. Note that except for Example 6, which was not cured, the epoxy, acrylic, urethane, and phenolic resin molded articles in all Examples and Comparative Examples had glass transition temperatures about 20° C. higher than those of commercially-available epoxy, acrylic, urethane, and phenolic resin molded articles, and had sufficient heat resistances.

Epoxy, urethane, acrylic, and phenolic resins, which were resin compositions prepared in the present Examples, are all excellent in heat resistance and widely used as industrially useful resins. However, these resins are not easily decomposed, and sometimes difficult to handle from the viewpoint of recycling products. In the present invention, it has been possible to achieve heat resistance in use as a resin molded article and degradability under relatively mild conditions using an alkaline aqueous solution by the lignin-skeleton-containing resin that contains a cross-linkage structure containing, as a main chain structure, a phenolated lignin containing a phenol-containing monomer represented by the general formula (I) and that has the characteristics of epoxy, urethane, acrylic, and phenolic resins, and the composition of the same. With no intention to be bound by theories though, it can be said that since the degradability of the lignin-skeleton-containing resins according to the present invention under an alkaline aqueous solution depends on OH groups present in $R_1$ or $R_2$ of the phenol-containing monomer represented by the general formula (I), all of the lignin-skeleton-containing resins can be decomposed under similar conditions. On the other hand, it can be said that since the heat resistance is enhanced by each cross-linkage structure in addition to by the lignin skeleton, each of the lignin-skeleton-containing resins exhibits excellent heat resistance unique to its own cross-linkable group.

The invention claimed is:

1. A resin composition comprising:
   an acrylated lignin formed by chemical bonding a compound containing an acryl group or a methacryl group to a phenolated lignin, wherein the phenolated lignin containing a repeating unit represented by the following general formula (I):

[Chem. 1]

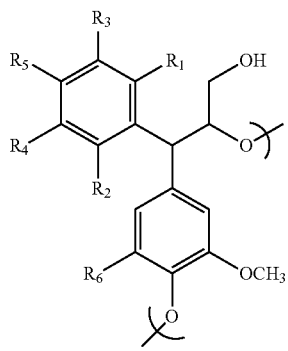
(I)

wherein $R_1$ to $R_5$ are each independently a monovalent group selected from H, OH, a $C_1$ to $C_6$ alkyl group, a $C_1$ to $C_6$ alkoxy group, and a $C_6$ to $C_{10}$ aryl group, or adjacent substituents among $R_1$ to $R_5$ form a substituted or unsubstituted aromatic ring together, at least one of $R_1$ and $R_2$ is a hydroxyl group, and $R_6$ is $OCH_3$ or H, and the phenolated lignin contains a repeating unit having a syringyl skeleton in which $R_6$ is $OCH_3$ in the general formula (I), at a mole fraction of 40% or more when a total molar amount of repeating units in the phenolated lignin is taken as 100%.

2. The resin composition according to claim 1, wherein the phenolated lignin contains a repeating unit in which at least one of $R_1$ and $R_2$ is a hydroxyl group in the general formula (I), at a mole fraction of 30% or more when a total molar amount of repeating units in the phenolated lignin is taken as 100%.

3. The resin composition according to claim 1, further comprising:
a catalyst.

4. A resin molded article comprising the resin composition according to claim 1.

5. A molded article formed in a mold, wherein the molded article formed by encapsulating a member that contains a metal material and/or a ceramic material with the resin composition according to claim 1.

6. The molded article formed in a mold according to claim 5, wherein
the molded article formed in a mold is a semiconductor device.

7. The molded article formed in a mold according to claim 5, wherein
the molded article formed in a mold is a molded transformer.

8. The molded article formed in a mold according to claim 5, wherein
the molded article formed in a mold is a switchgear.

* * * * *